United States Patent
Muehlenbrock (10) Patent No.: US 11,235,685 B2
(45) Date of Patent: Feb. 1, 2022

(54) VEHICLE SEAT

(71) Applicant: Adient Engineering and IP GmbH, Burscheid (DE)

(72) Inventor: Ludger Muehlenbrock, Recklinghausen (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 0 days.

(21) Appl. No.: 17/260,419

(22) PCT Filed: Jul. 18, 2019

(86) PCT No.: PCT/EP2019/069441
§ 371 (c)(1),
(2) Date: Jan. 14, 2021

(87) PCT Pub. No.: WO2020/020754
PCT Pub. Date: Jan. 30, 2020

(65) Prior Publication Data
US 2021/0261023 A1   Aug. 26, 2021

(30) Foreign Application Priority Data

Jul. 25, 2018 (DE) ...................... 10 2018 117 927.8

(51) Int. Cl.
*B60N 2/16* (2006.01)
*B60N 2/68* (2006.01)

(52) U.S. Cl.
CPC ........... *B60N 2/1615* (2013.01); *B60N 2/165* (2013.01); *B60N 2/682* (2013.01)

(58) Field of Classification Search
CPC .................................................... B60N 2/165
See application file for complete search history.

(56) References Cited

U.S. PATENT DOCUMENTS

| | | | |
|---|---|---|---|
| 2018/0009338 A1* | 1/2018 | Kim | B60N 2/1615 |
| 2019/0338843 A1* | 11/2019 | Romer | B60N 2/1615 |
| 2021/0229573 A1* | 7/2021 | Fischer | B60N 2/0232 |

FOREIGN PATENT DOCUMENTS

| | | | |
|---|---|---|---|
| CN | 111386211 A * | 7/2020 | ........... B60N 2/1615 |
| DE | 19540631 A1 | 5/1997 | |

(Continued)

OTHER PUBLICATIONS

European Patent Office, International Search Report and Written Opinion in Application No. PCT/EP2019/069441, dated Oct. 9, 2019, 11 pages, Rijswijk, Netherlands.

*Primary Examiner* — Timothy J Brindley
(74) *Attorney, Agent, or Firm* — Marshall & Melhorn, LLC (57) ABSTRACT

A vehicle seat (1) having adjustment kinematics, in particular height-adjustment kinematics (6), with movable rockers (12, 14), in particular for adjusting the height of a seat frame of the vehicle seat (1) relative to a connectable vehicle structure, wherein at least one rocker (14) is mounted rotatably about an axis (A), in particular about an axis (A) of a transverse tube (16), and a toothed segment (18) which is connected to the at least one rocker (14) is provided, wherein the vehicle seat (1) has a drive (20) for moving the at least one rocker (14), and the drive (20) is mounted on a seat frame, in particular on a side part (100) of the seat frame, wherein a pinion (26) of the drive (20) meshes with the toothed segment (18), wherein, by aligning the position of the entire drive (20) relative to the side part (100) by means of a compensating body (200), the pinion (26) is positioned relative to the toothed segment (18) in a manner free from play.

18 Claims, 8 Drawing Sheets

(56) References Cited

FOREIGN PATENT DOCUMENTS

| | | | |
|---|---|---|---|
| DE | 19709852 A1 | 9/1998 | |
| DE | 102007062358 B3 | 10/2008 | |
| DE | 102009014651 A1 | 12/2010 | |
| DE | 102014207529 A1 | 7/2015 | |
| DE | 102015015878 A1 | 6/2017 | |
| DE | 102015223485 A1 | 6/2017 | |
| DE | 102016001564 A1 * | 8/2017 | ........... B60N 2/1615 |
| DE | 102016122439 A1 | 5/2018 | |
| DE | 102017206994 A1 | 10/2018 | |
| DE | 102019122310 A1 * | 10/2020 | ............. B60N 2/165 |
| FR | 3028463 A1 * | 5/2016 | ............. B60N 2/165 |
| KR | 102235731 B1 * | 4/2021 | |
| WO | WO-2018020836 A1 * | 2/2018 | ............... B60N 2/16 |

* cited by examiner

VEHICLE SEAT

FIELD

The invention relates to a vehicle seat having adjustment kinematics with movable rockers, wherein at least one rocker is mounted rotatably about an axis, and a toothed segment which is connected to the at least one rocker is provided, wherein the vehicle seat has a drive for moving the at least one rocker, and the drive is mounted on a seat frame, in particular on a side part of the seat frame, wherein a pinion of the drive meshes with the toothed segment.

BACKGROUND

Drive devices for operating or adjusting the seat function are known both for vehicle seat height adjusters and for backrest adjusters. These are often electric drives or mechanical bidirectional step by step switching systems, the actuating angle of which is generally from 15° to 30° and which transmit only the respective actuation direction and are decoupled on the return path from the output. Such mechanisms are conventional as load-absorbing systems in height adjusters. When used as backrest adjusters, the driven backrest fitting, which is designed as a geared fitting, generally absorbs the working loads and crash loads. Known drive devices are disclosed, for example, in DE 197 09 852 A1 and DE 195 40 631 A1.

A drive device which is known through use comprises a pinion which meshes with a toothing of height adjustment kinematics of the vehicle seat, wherein the drive device is fastened to a structural part of the vehicle seat. During the assembly of the drive device, the latter is pressed by the fitter in the direction of the meshing and is initially held manually in this position. The fitter can release the drive device again only when the fitter has secured the position of the drive device relative to the structural part by means of a plurality of screws. In the event of inattentiveness during the assembly process, the position of the drive device can be displaced again before the screws are fully tightened.

DE 10 2015 223 485 A1 discloses a height adjuster for a vehicle seat, wherein a base plate which is mounted on a side part and holds a drive is aligned relative to the side part of the vehicle seat by means of a crash bolt.

DE 10 2016 122 439 A1 discloses a seat height adjustment device for a vehicle seat, said device having a drive pinion, which is rotatable by means of a drive shaft, and an adjustment element, wherein the adjustment element can be pivoted in order to adjust the seat height and has a curved guide slot and a toothed segment, wherein the drive pinion is in engagement with the toothed segment. A guide device for coupling the drive pinion to the toothed segment is provided here, wherein the drive pinion is mounted on the guide device, wherein the guide device is guided with a guide pin in the guide slot, and the guide device is adjustable relative to the adjustment element in order to reduce a tolerance or play.

Tolerances of individual parts and assembly inaccuracies bring about the risk of an incorrect position of the toothings of pinion and height adjustment kinematics with respect to one another. If the toothings are located too close to one another, the assembly becomes more difficult. Play between the toothings can in contrast lead to noises and reduces the forces which can be transmitted via the meshing point.

SUMMARY

The invention is based on the problem of improving a vehicle seat with a drive device of the type mentioned at the beginning, in particular of permitting a low-play or play-free meshing between a pinion of the drive device and a toothing of adjustment kinematics, in particular height adjustment kinematics, of the vehicle seat, and of reducing the noise produced by the adjustment kinematics and the drive device.

This problem is solved according to the invention by a vehicle seat having adjustment kinematics, in particular height adjustment kinematics, with movable rockers, in particular for adjusting the height of a seat frame of the vehicle seat relative to a connectable vehicle structure, wherein at least one rocker is mounted rotatably about an axis, in particular about an axis of a transverse tube, and a toothed segment which is connected to the at least one rocker is provided, wherein the vehicle seat has a drive for moving the at least one rocker, and the drive is mounted on a seat frame, in particular on a side part of the seat frame, wherein a pinion of the drive meshes with the toothed segment. By aligning the position of the entire drive relative to the side part by means of a compensating body, the pinion is positioned relative to the toothed segment in a manner free from play.

Owing to the fact that, by aligning the position of the entire drive relative to the side part by means of a compensating body, the pinion is positioned relative to the toothed segment in a manner free from play, manufacturing-induced tolerances within the adjustment kinematics are eliminated during the assembly, which in particular prevents annoying noises during the subsequent use of the vehicle seat.

Advantageous refinements which can be used individually or in combination with one another are described below and/or are the subject matter of the dependent claims.

The pinion of the drive can be secured to the side part by means of a bridge and a spacer sleeve, thus forming a closed system of forces.

The compensating body can have a supporting portion with a bevel. The bevel can facilitate assembly of the adjustment kinematics. Ribs can be provided on a surface of the compensating body that is oriented in the direction of the toothed segment. Ribs can be provided on a surface of the supporting portion of the compensating body that is oriented in the direction of the toothed segment. The ribs can ensure a smaller contact surface with the toothed segment and can thereby reduce a frictional resistance.

The compensating body can be supported on a spacer sleeve, which is arranged behind the toothed segment as viewed from the pinion. The compensating body can be supported on a crash bolt, which is arranged behind the toothed segment as viewed from the pinion. The compensating body can be manufactured from a plastic.

The pinion of the drive can be guided through an opening in the side part with a gap being formed. The side part can have a through bore and two elongated holes. The drive can be mounted by means of a first threaded bolt in the through bore and by means of two further threaded bolts in in each case one of the two elongated holes on the side part. The two elongated holes are preferably aligned parallel in their respective alignment. The two elongated holes are aligned in their respective longitudinal extent preferably parallel to an imaginary connecting line of the passage point of the axis of the transverse tube in the side part and of the passage point of the axis of the pinion in the side part. The through bore can have sufficient play for the first threaded bolt, and therefore the two further threaded bolts are movable along a longitudinal extent of the elongated holes.

The drive can have a step by step transmission. The drive can have a geared motor.

BRIEF DESCRIPTION OF THE FIGURES

The invention is explained in more detail below with reference to an advantageous exemplary embodiment illustrated in the figures and with reference to a modification of the exemplary embodiment. However, the invention is not restricted to this exemplary embodiment or to the modification thereof. In the figures.

DETAILED DESCRIPTION

Figure 1:
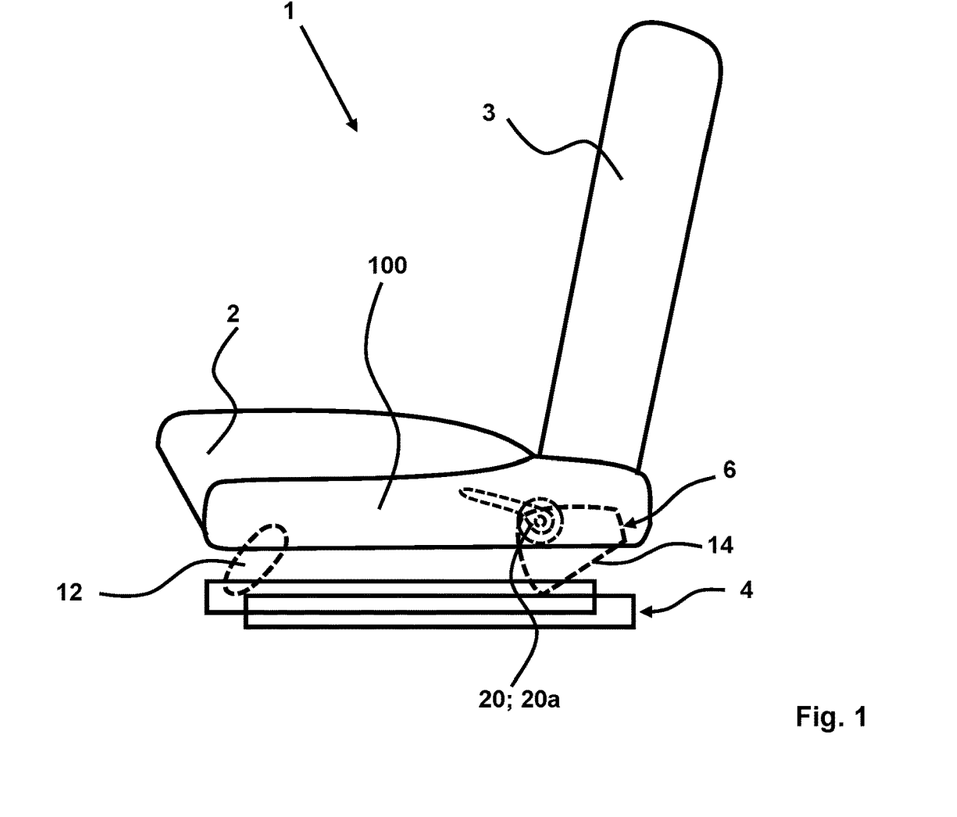
FIG. 1: shows a schematic illustration of a vehicle seat according to the invention according to the exemplary embodiment.
Figure 4:
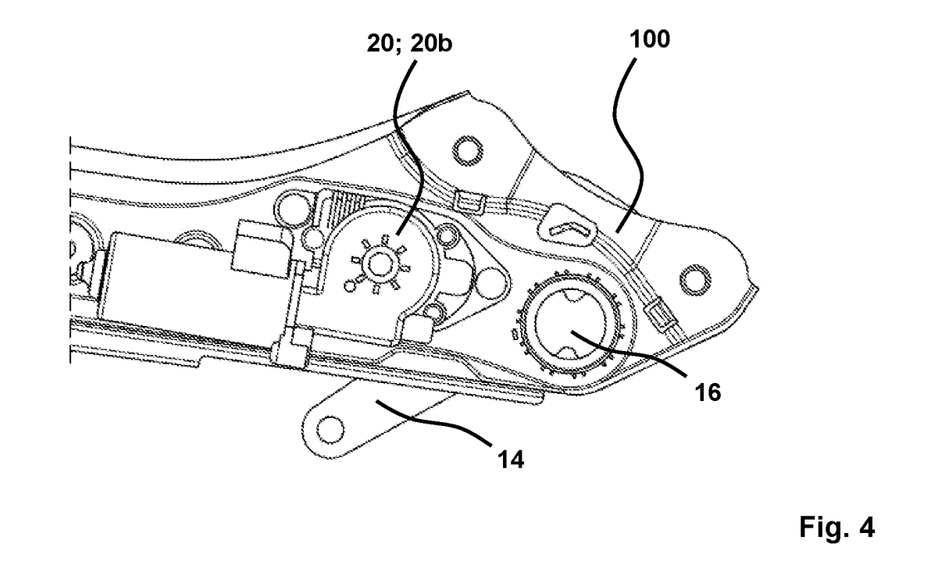
Figure 5:
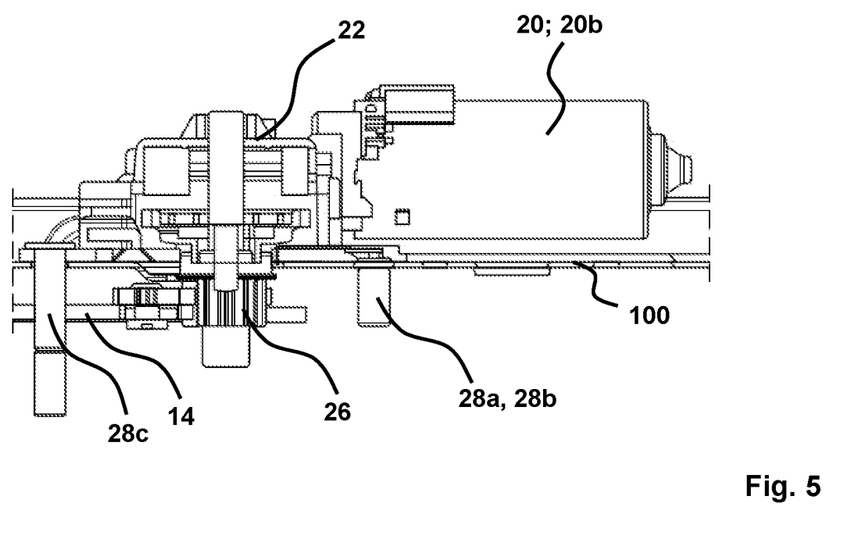
FIG. 5: shows a partial sectional illustration of the side part and of the geared motor from FIG. 4, FIG. 6: shows a perspective view of a portion of the side part.
Figure 16:
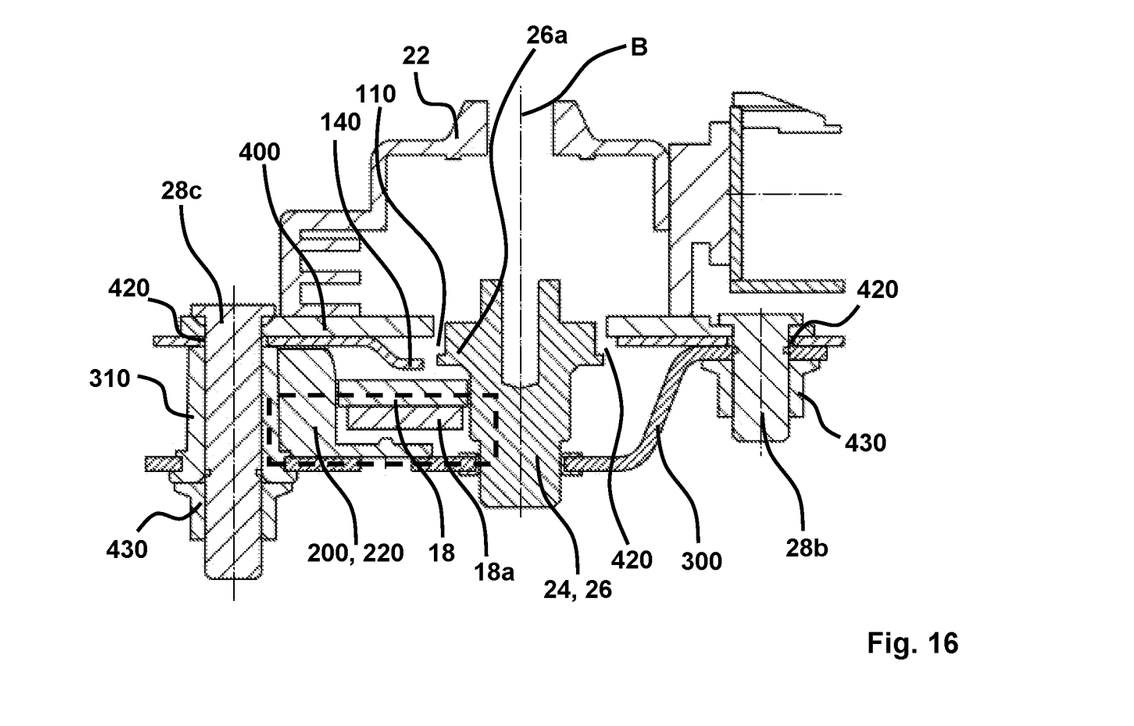
FIG. 16: shows a sectional illustration of the side part from FIG. 5.

FIG. 1 illustrates a vehicle seat 1, in particular a motor vehicle seat, with adjustment kinematics having a drive 20, here height adjustment kinematics 6. The vehicle seat 1 has a seat part 2 and a backrest 3, wherein the seat part 2 comprises a seat frame. The seat frame has two opposite side parts 100. The vehicle seat 1 is connectable to a vehicle structure so as to be displaceable in the longitudinal direction by means of at least one longitudinal adjuster 4. The drive 20 is designed as a step by step transmission 20a with a lever. Such a step by step transmission 20a is known, for example, from DE 10 2009 014 651 A1. In a modification of the exemplary embodiment, the drive 20, as shown in FIGS. 4, 5 and 16, is configured as a geared motor 20b which is known, for example, from DE 197 09 852 A1. Apart from the drive 20, the exemplary embodiment and the modification thereof do not differ from each other.

In order to adjust the height of the seat frame of the vehicle seat 1 relative to the vehicle structure, the height adjustment kinematic 6 on both sides of the vehicle seat 1 has two movable rockers 12, 14 and a respective side part 100. The side part 100 is connected in each case to a front rocker 12 and to a rear rocker 14. The front rockers 12 are in each case mounted on the side parts 10 and on the longitudinal adjuster 4. The rear rockers 14 are mounted rotatably about an axis A of a transverse tube 16. The rear rockers 14 are mounted rotatably on the longitudinal adjuster 4. Alternatively to the longitudinal adjuster 4, a mounting of the front rockers 12 and of the rear rockers 14 on a base or directly on the vehicle structure can likewise be provided.

Figure 2:
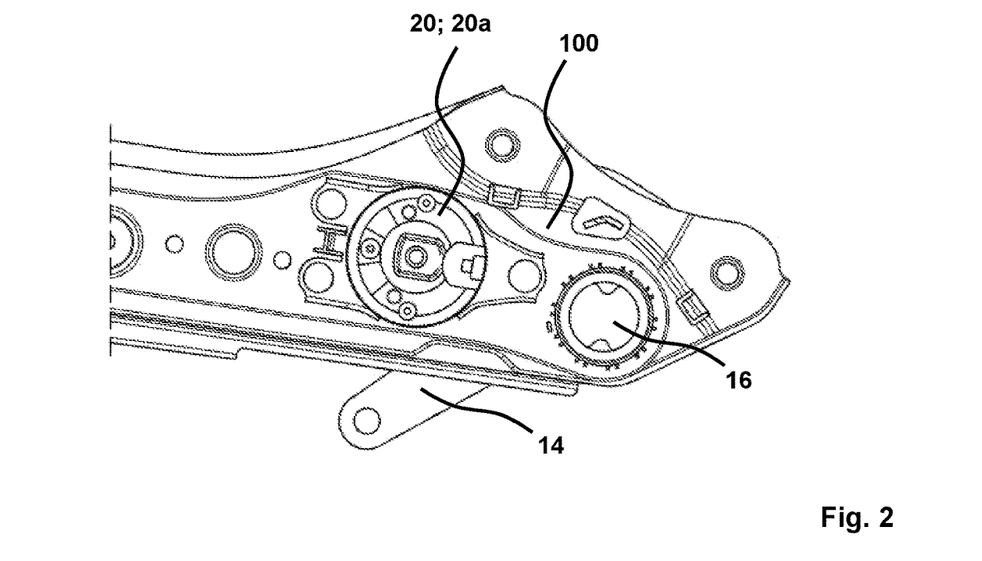
FIG. 2: shows a side view of a side part of the vehicle seat from FIG. 1 and a step by step transmission as drive.
Figure 3:
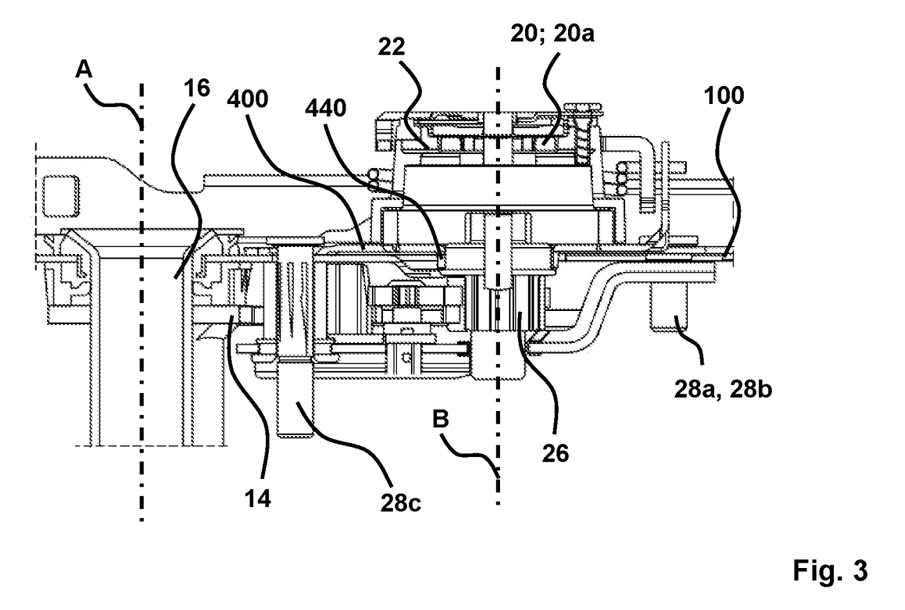
FIG. 3: shows a partial sectional illustration of the side part and of the step by step transmission from FIG. 2, FIG. 4: shows a side view of a side part with a geared motor as drive, according to the modification of the exemplary embodiment.

FIG. 2 shows the side part 100 with the drive 20 in the form of a step by step transmission 20a of the exemplary embodiment. FIG. 3 shows part of a sectional illustration of the side part 100 from FIG. 2. FIG. 4 illustrates the side part 100 with the drive 20 in the form of a geared motor 20b of the modification of the exemplary embodiment, which is also shown in a partial sectional illustration in FIG. 5. The two embodiments of the drive 20 differ merely in their manner of operation and production of a rotational movement of a respective pinion 26 on the output side.

Further features of the drive 20 and of the pinion 26 in conjunction with further components are explained below. Unless explicitly described differently, the pinion 26 can be part of the drive 20 in the form of both the step by step transmission 20a and the geared motor 20b. On the output side, the drive 20 has a pinion 26 which is arranged on a drive shaft 24 and is rotatable about an axis B of the pinion 26. The drive 20 furthermore has a base plate 400 by means of which the drive 20 can be fastened to the side part 100. The drive 20 has a housing 22.

Figure 6:
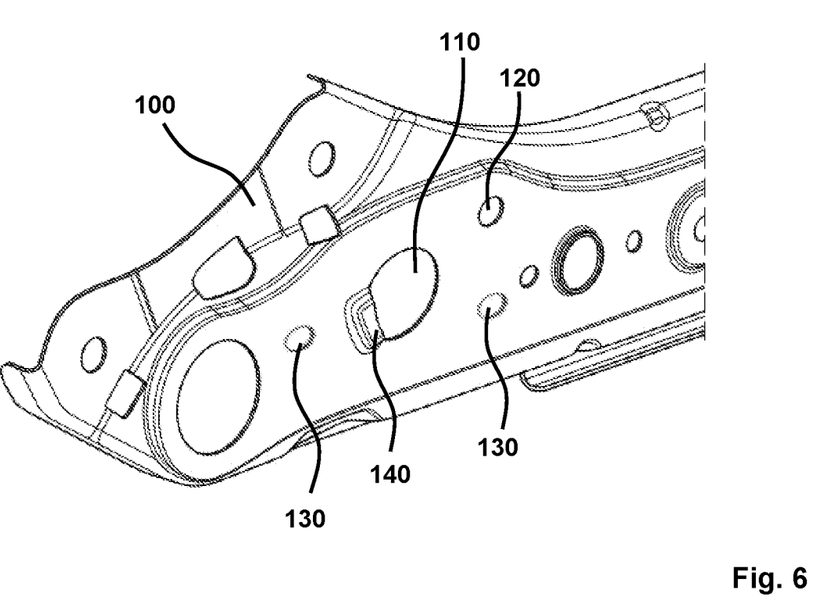

FIG. 6 shows a portion of the side part 100, having an opening 110 for the passage of the pinion 26 of the drive 20. The side part 100 furthermore has a through bore 120 and two elongated holes 130.

Figure 7:
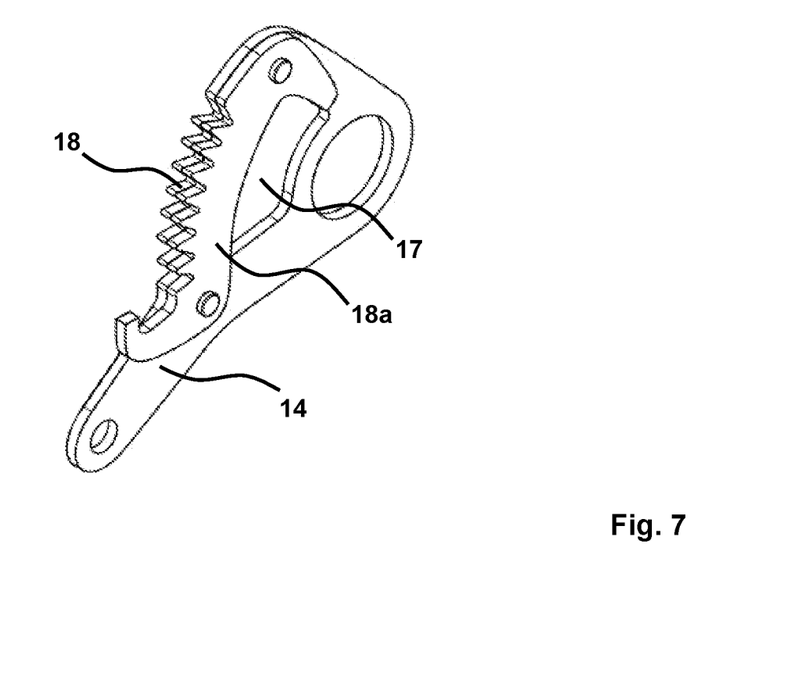
FIG. 7: shows a perspective view of a rocker with a toothed segment of height adjustment kinematics.

FIG. 7 shows a toothed segment 18 which is configured here integrally with the rear rocker 14. The toothed segment 18 can alternatively likewise be configured in two parts with the rear rocker 14. The toothed segment 18 is reinforced in the region of a toothing by means of a further toothed portion 18a. The toothing of the toothed segment 18 is aligned with a toothing of the further toothed portion 18a.

Figure 8:
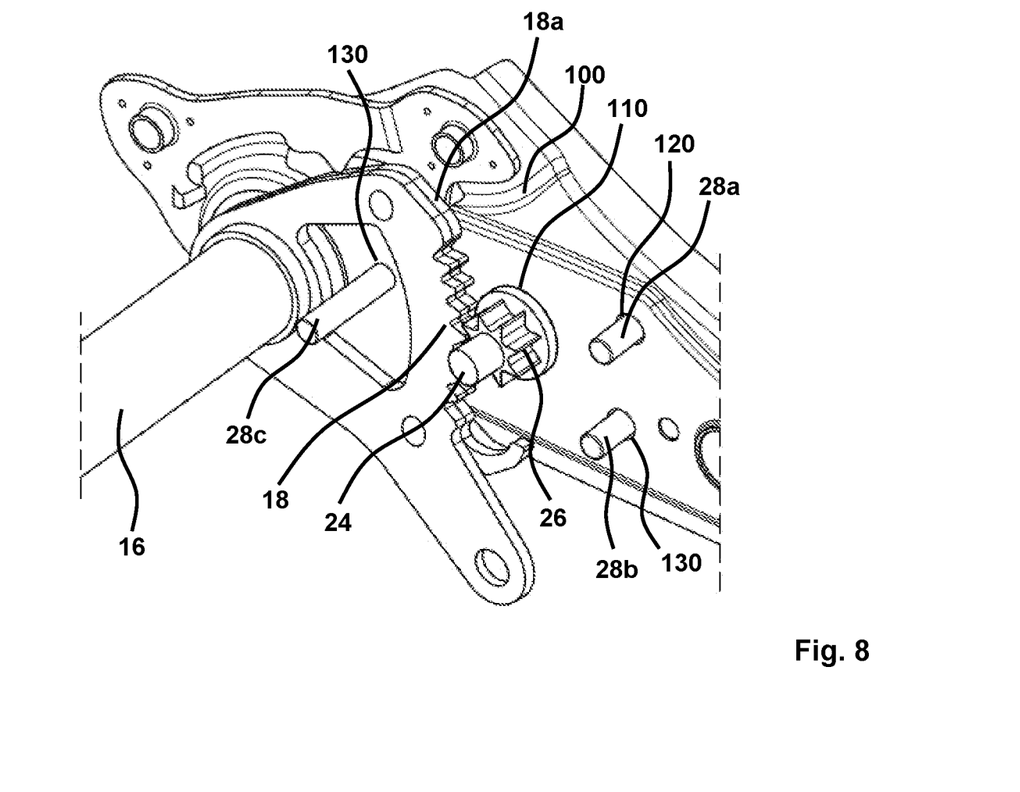
FIG. 8: shows a perspective view of a detail of the height adjustment kinematics in a first assembly state.
Figure 9:
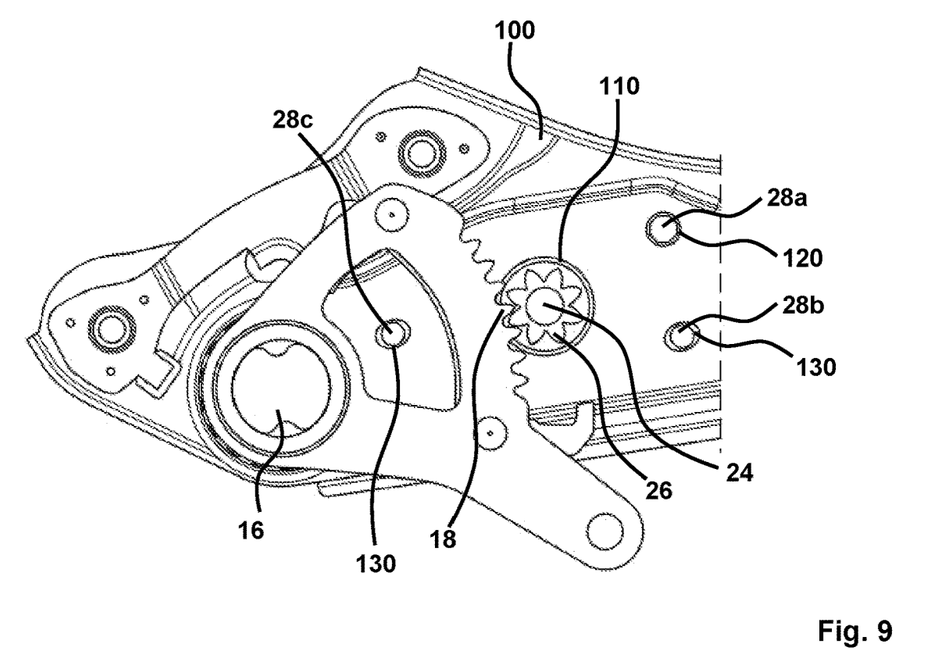
FIG. 9: shows a side view of the height adjustment kinematics in the first assembly state from FIG. 8, FIG. 10: shows a perspective view of the detail of the height adjustment kinematics from FIG. 8 in a second assembly state.

FIGS. 8 and 9 show a detail of the height adjustment kinematic 6 in a first assembly state. The rear rocker 14 is mounted rotatably about an axis A of the transverse tube 16. The rear rocker 14 engages around the transverse tube 16. The rear rocker 14 is fixed to the transverse tube 16. The rear rocker 14 is preferably welded to the transverse tube 16. The pinion 26 of the drive 20 protrudes through the opening 110 from a side of the side part 100 that is opposite the toothed segment 18. The pinion 26 is in engagement with the toothed segment 18. Furthermore, the drive 20 has three threaded bolts 28a, 28b, 28c which are in each case guided through the passage bore 120 or through one of the elongated holes 130. While the threaded bolts 28a projecting through the through bore 120 and the pinion 26 arranged in the opening 110 are effected by play all the way round, the two threaded bolts 28b, 28c which are arranged in the elongated holes 130 are guided movably along a longitudinal extent of the elongated holes 130. The two elongated holes 130 essentially have play only along their respective longitudinal extent. The two further threaded bolts 28b, 28c are held perpendicularly to the longitudinal extent of the elongated holes 130 in a manner substantially free from play.

Figure 10:
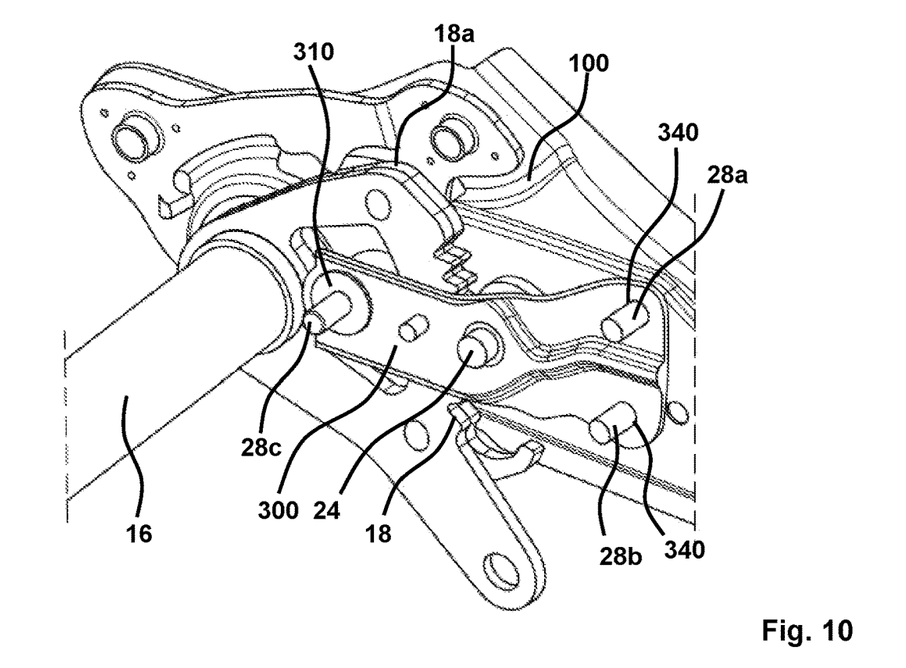

FIG. 10 shows the detail of the height adjustment kinematic 6 in a second assembly state. In contrast to FIGS. 8 and 9, a bridge 300 having a compensating body 200 has been pushed onto the free ends of the threaded bolts 28a, 28b, 28c and of the drive shaft 24.

Figure 11:
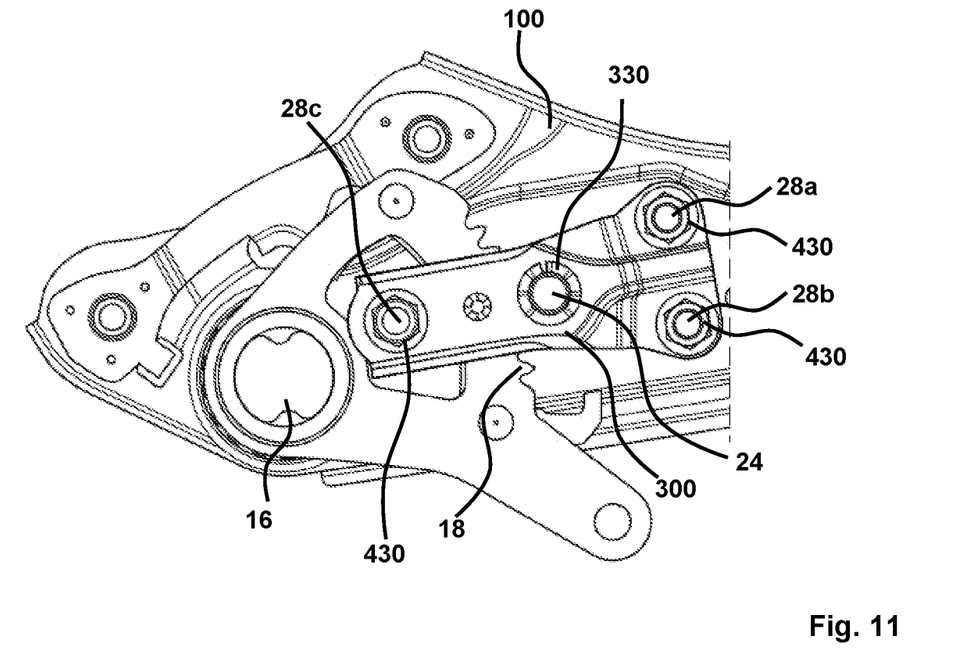
FIG. 11: shows a side view of the detail of the height adjustment kinematics from FIG. 8 in a third assembly state.

In the third assembly state of the height adjustment kinematic 6 that is shown in FIG. 11, the bridge 300 is secured by nuts 430 screwed on the threaded bolts 28a, 28b, 28c.

Figure 12:
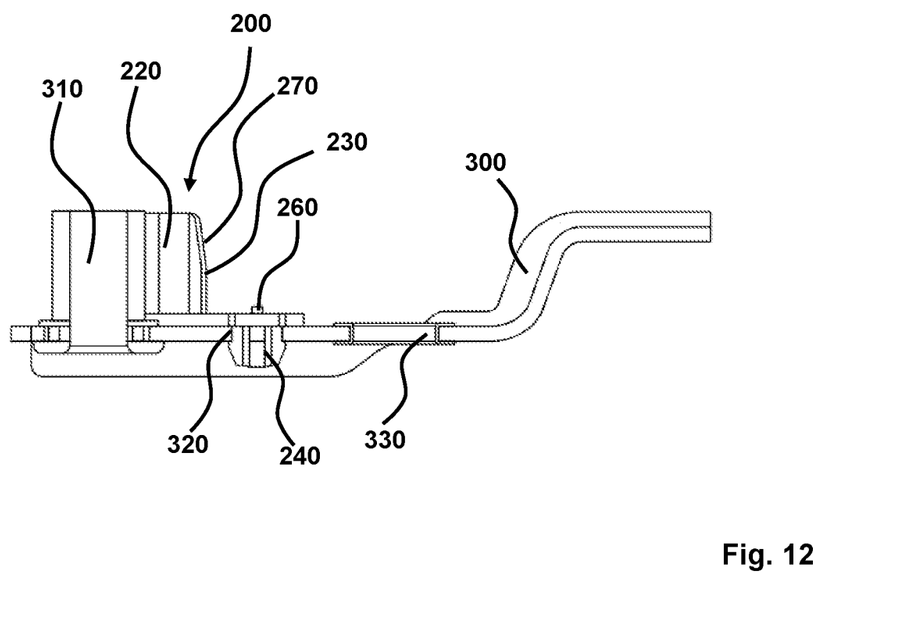
FIG. 12: shows a sectional illustration of a bridge with a compensating body.
Figure 13:
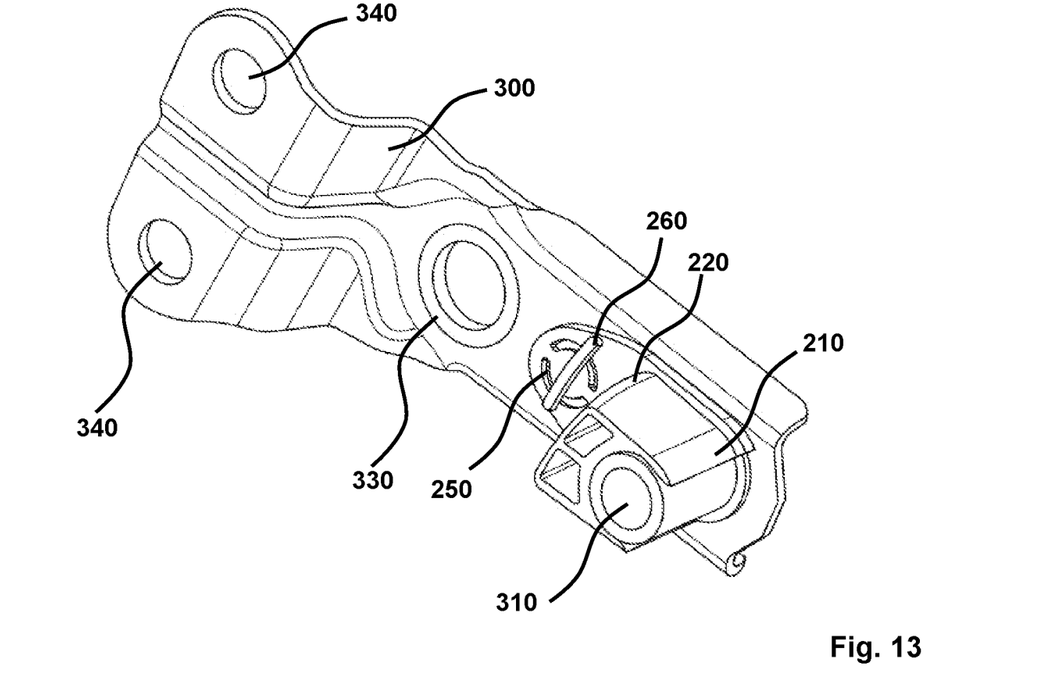
FIG. 13: shows a perspective view of the bridge from FIG. 12 with the compensating body.
Figure 14:
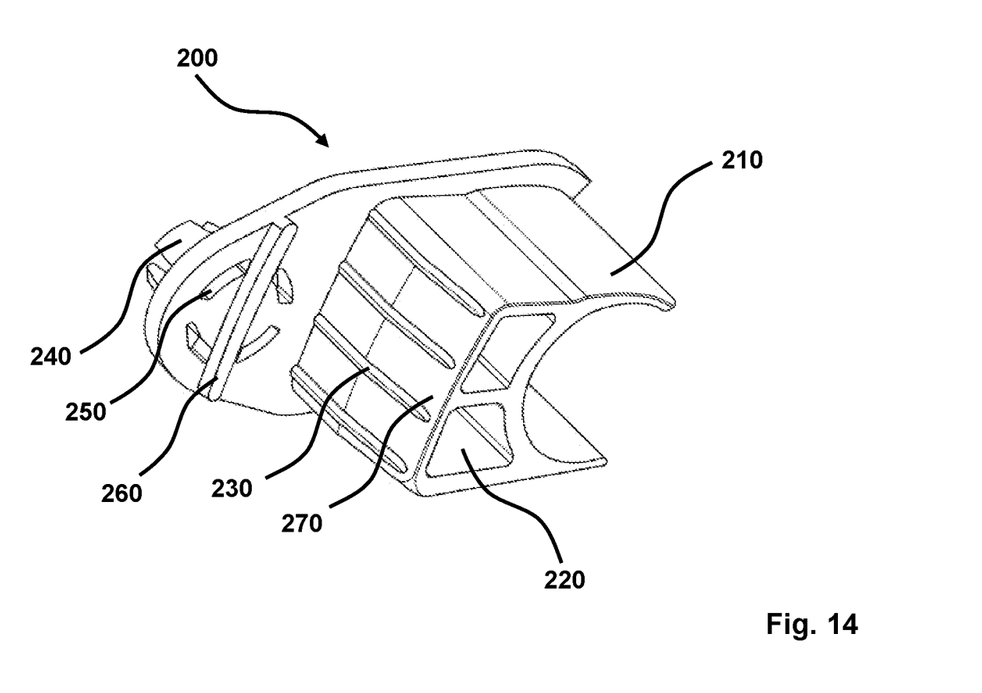
FIG. 14: shows a perspective view of the compensating body.

FIG. 12 shows the bridge 300 with the compensating body 200 in a sectional illustration whereas FIG. 13 shows the bridge 300 with the compensating body 200 in a perspective view. FIG. 14 shows a perspective view of the compensating body 200.

The bridge 300 is connected here to a spacer sleeve 310, but may also be configured integrally with the spacer sleeve 310. The spacer sleeve 310 is fixed to the bridge 300, in particular is riveted thereon, preferably hollow-riveted thereon. The compensating body 200 has a holding portion 210 which at least partially engages around the space sleeve 310. The compensating body 200 furthermore has a supporting portion 220 which in sections has a bevel 270 for easier assembly. The compensating body 200 furthermore has ribs 230. The ribs 230 extend over the supporting portion 220 and the bevel 270. The ribs 230 are slightly deformed by the assembly, in particular are deformed plastically or elastically. The ribs 230 can be slightly abraded by being pushed onto the toothed segment 18.

The rear rocker 14 has an opening 17 between the toothed segment 18, in particular between the toothed portion 18a and a connecting region with the transverse tube 16. In the mounted state, the spacer sleeve 310 is guided together with the compensating body 200, in particular with the supporting portion 220 of the compensating body 200, through the opening 17 in the rear rocker 14. In the mounted state, the ribs 230 lie in a manner free from play on a rear side which is spaced apart from the toothing of the toothed segment 18.

The compensating body 200 is clipped in a holding opening 320 of the bridge 300 by means of at least one clip 240, here a plurality of clips 240. The clips 240 prevent rotation of the compensating body 200 about the spacer sleeve 310. In the region of the clip 240, slots 250 are provided in the compensating body 200. On a side of the compensating body 200 that faces away from the bridge 300, a web 260 is arranged in the region of the clip 240, the web reinforcing the compensating body 200 in the region of the clip 240. The web 260 can furthermore serve as a spacer for the toothed segment 18. The bridge 300 furthermore has a bearing element 330 which can be formed in particular by means of what is referred to as a NORGLIDE® bearing. In the mounted state, the drive shaft 24 is mounted in the bearing element 330 preferably in a manner free from play. The bridge 300 furthermore has two fastening openings 340 which serve for fixing at the threaded bolts 28a, 28b. In the mounted state, the fastening openings 340 have a radial play relative to the threaded bolts 28a, 28b.

Figure 15:
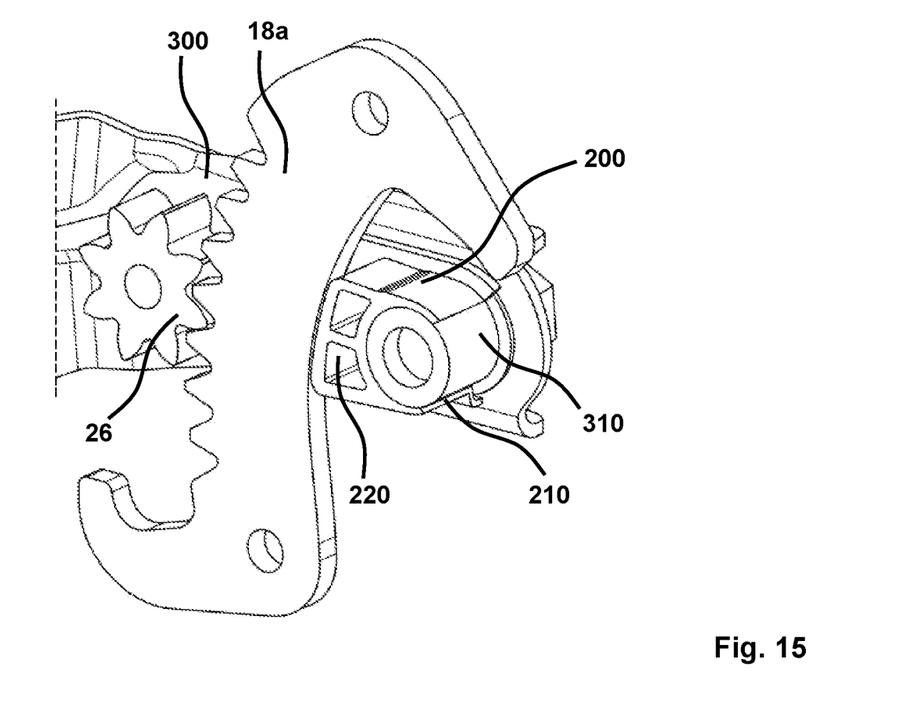
FIG. 15: shows a perspective view of the bridge, the compensating body, the toothed segment and the pinion.

FIG. 15 shows a perspective view of the bridge 300, the compensating body 200, the toothed portion 18a and the pinion 26.

FIG. 16 shows a sectional illustration of the side part 100 from FIG. 2 with the fully installed height adjustment kinematic 6. The side part 100 has a projection 140 in the region of the opening 110 for the pinion 26. The projection 140 prevents contact of the toothed portion 18a with a basic portion 26a of the pinion 26 in the event of a loading due to an accident.

The drive 20 is connected to the side part 100 of the seat frame via the base plate 400 in such a manner that the pinion 26 of the drive 20 is in engagement with the toothed segment 18 in a manner free from play. The pinion 26 of the drive 20 is secured to the side part 100 by means of the bridge 300 and the spacer sleeve 310, thus forming a closed system of forces. The closed system of forces in general denotes the closed system, illustrated by broken lines, between the base plate 400, the spacer sleeve 310, the bridge 300 and the pinion 26 or a portion of the drive shaft 24 of the pinion 26, wherein said closed system has a closed force flux along the broken line in FIG. 16. A play-free alignment of the pinion 26 with the toothed segment 18 takes place by aligning the position of the mounted base plate 400 relative to the side part 100 by means of the compensating body 200. In the present case, the spacer sleeve 310 aligns the pinion 26 via the bridge 300 relative to the toothed segment 18 by means of the compensating body 200. The base plate 400 and the drive 20 follow said alignment of the pinion 26 relative to the toothed segment 18. In order to finish the assembly of the drive 20 on the side part 100, the base plate 400 is fixed in the aligned state relative to the side part 100 by means of the nuts 430 and the threaded bolts 28a, 28b, 28c. In order to avoid overdetermining the closed system, the threaded bolts 18b, 18c in the elongated holes 130 and a drawn collar 440 formed in the base plate 400 are passed through the opening 110 in the side part 100, with a gap 420 being formed.

The features disclosed in the above description, the claims and the drawings may be of significance both individually and in combination for implementing the invention in its various refinements.

Although the invention has been described in detail in the drawings and the previous illustration, the illustrations should be understood as illustrative and by way of example and non-limiting. In particular, the selection of the graphically illustrated proportions of the individual elements should not be interpreted as required or restricting. Furthermore, the invention is in particular not restricted to the exemplary embodiments explained. Further variants of the invention and the realization thereof are apparent to a person skilled in the art from the above disclosure, the figures and the claims.

Terms such as "comprise", "have", "include", "contain" and the like used in the claims do not exclude further elements or steps. The use of the indefinite article does not exclude a plurality. An individual device can carry out the functions of a plurality of units or devices mentioned in the claims.

LIST OF REFERENCE SIGNS

1 Vehicle seat
2 Seat part
3 Backrest
4 Longitudinal adjuster
6 Height adjustment kinematic
12 Front rocker
14 Rear rocker
16 Transverse tube
17 Opening
18 Toothed segment
18a Toothed portion
20 Drive
20a Step by step transmission
20b Geared motor
22 Housing
24 Drive shaft
26 Pinion
26a Basic portion
28a Threaded bolt 28b Threaded bolt
28c Threaded bolt
100 Side part
110 Opening
120 Through bore
130 Elongated hole
140 Projection
200 Compensating body
210 Holding portion
220 Supporting portion
230 Rib
240 Clip
250 Slot
260 Web
270 Bevel
300 Bridge
310 Spacer sleeve
320 Holding opening
330 Bearing element
340 Fastening opening
400 Base plate
420 Gap
430 Nut
440 Drawn collar
A Axis (of the transverse tube)
B Axis (of the pinion)

What is claimed is:

1. A vehicle seat, comprising:
adjustment kinematics with movable rockers, wherein at least one rocker is mounted rotatably about an axis, and a toothed segment which is connected to the at least one rocker is provided,
wherein the vehicle seat has a drive for moving the at least one rocker, and the drive is mounted on a seat frame,
wherein a pinion of the drive meshes with the toothed segment, wherein by aligning the position of the entire drive relative to the side part via a compensating body, the pinion is positioned relative to the toothed segment in a manner free from play,
wherein at least one rib is provided on a surface of the compensating body that is oriented in the direction of the toothed segment.

2. The vehicle seat as claimed in claim 1, wherein the adjustment kinematics are height adjustment kinematics.

3. The vehicle seat as claimed in claim 1, wherein the rockers are configured for adjusting the height of a seat frame of the vehicle seat relative to a connectable vehicle structure.

4. The vehicle seat as claimed in claim 1, wherein the axis is the axis of a transverse tube.

5. The vehicle seat as claimed in claim 1, wherein the drive is mounted on a side part of the seat frame.

6. The vehicle seat as claimed in claim 5, wherein the pinion of the drive is secured to the side part via a bridge and a spacer sleeve, thus forming a closed system of forces.

7. The vehicle seat as claimed in claim 1, wherein the compensating body has a supporting portion with a bevel.

8. The vehicle seat as claimed in claim 7, wherein the at least one rib extends over the supporting portion and the bevel.

9. The vehicle seat as claimed in claim 1, wherein the compensating body is supported on a spacer sleeve, which is arranged behind the toothed segment as viewed from the pinion, or on a crash bolt.

10. The vehicle seat as claimed in claim 1, wherein the compensating body is manufactured from a plastic.

11. The vehicle seat as claimed in claim 1, wherein the pinion of the drive is guided through an opening in the side part with a gap being formed.

12. The vehicle seat as claimed in claim 1, wherein the side part has a through bore and two elongated holes.

13. The vehicle seat as claimed in claim 12, wherein the drive is mounted by a threaded bolt in a manner free from play in the through bore and by two further threaded bolts in each case one of the two elongated holes on the side part.

14. The vehicle seat as claimed in claim 1, wherein the drive has a step by step transmission or a geared motor.

15. A vehicle seat, comprising:
adjustment kinematics with movable rockers, wherein at least one rocker is mounted rotatably about an axis, and a toothed segment which is connected to the at least one rocker is provided,
wherein the vehicle seat has a drive for moving the at least one rocker, and the drive is mounted on a seat frame,
wherein a pinion of the drive meshes with the toothed segment, wherein by aligning the position of the entire drive relative to the side part via a compensating body, the pinion is positioned relative to the toothed segment in a manner free from play,
wherein the compensating body has a supporting portion with a bevel,
wherein the at least one rib extends over the supporting portion and the bevel.

16. A vehicle seat, comprising:
adjustment kinematics with movable rockers, wherein at least one rocker is mounted rotatably about an axis, and a toothed segment which is connected to the at least one rocker is provided,
wherein the vehicle seat has a drive for moving the at least one rocker, and the drive is mounted on a seat frame,
wherein a pinion of the drive meshes with the toothed segment, wherein by aligning the position of the entire drive relative to the side part via a compensating body, the pinion is positioned relative to the toothed segment in a manner free from play, wherein the compensating body is clipped in a holding opening of a bridge by at least one clip.

17. The vehicle seat as claimed in claim 16, wherein in the region of the at least one clip slots are provided in the compensating body.

18. The vehicle seat as claimed in claim 17, wherein a web is arranged in the region of the clip to reinforce the compensating body.

* * * * *